United States Patent [19]

Faulbecker

[11] 3,726,577
[45] Apr. 10, 1973

[54] ROLLER BEARING, ESPECIALLY FOR THE BEARING OF THE STAR PIN OF A UNIVERSAL JOINT

[75] Inventor: Gerd Faulbecker, Essen-Steele, Germany

[73] Assignee: Gelenkwellenbau GmbH, Essen, Germany

[22] Filed: Feb. 18, 1971

[21] Appl. No.: 116,468

[30] Foreign Application Priority Data

Feb. 19, 1970  Germany............G 70 06 011.6

[52] U.S. Cl. ..................................308/212
[51] Int. Cl. ..................................F16c 33/34
[58] Field of Search.........................308/212

[56] References Cited

UNITED STATES PATENTS

| 2,036,978 | 4/1936 | Anderson | 308/212 |
| 2,336,579 | 12/1943 | Venditty et al. | 308/212 |
| 2,488,848 | 11/1949 | Carullo et al. | 308/212 |
| 3,107,949 | 10/1963 | Moskovitz | 308/212 |
| 3,423,958 | 1/1969 | Koelling | 308/216 |

FOREIGN PATENTS OR APPLICATIONS

| 434,387 | 8/1935 | Great Britain | 308/241 |

Primary Examiner—Charles J. Myhre
Assistant Examiner—Frank Susko
Attorney—Curt M. Avery, Arthur E. Wilfond, Herbert L. Lerner and Daniel J. Tick

[57] ABSTRACT

Roller bearing for a bearing system of journal pins in universal joints having a pot-shaped solid bushing as an outer support for the rollers of the bearing includes a sheet-metal sleeve press-fitted in the solid bushing, the sleeve forming at the inner surface thereof an outer race for the rollers, the sleeve having ends formed as guiding rims for the rollers.

2 Claims, 2 Drawing Figures

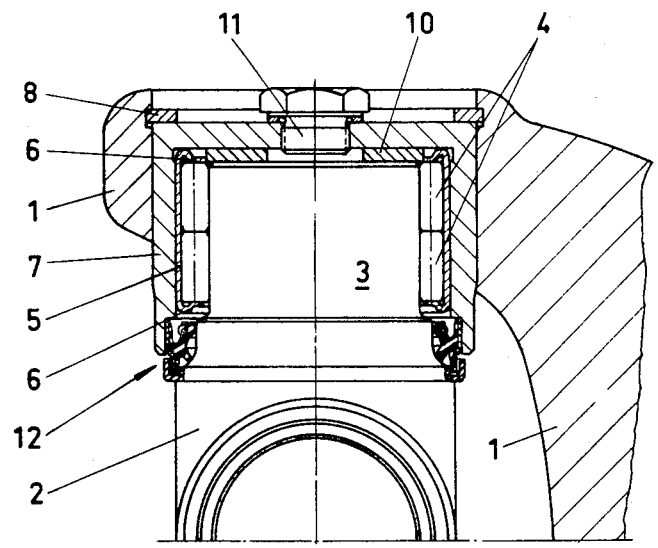
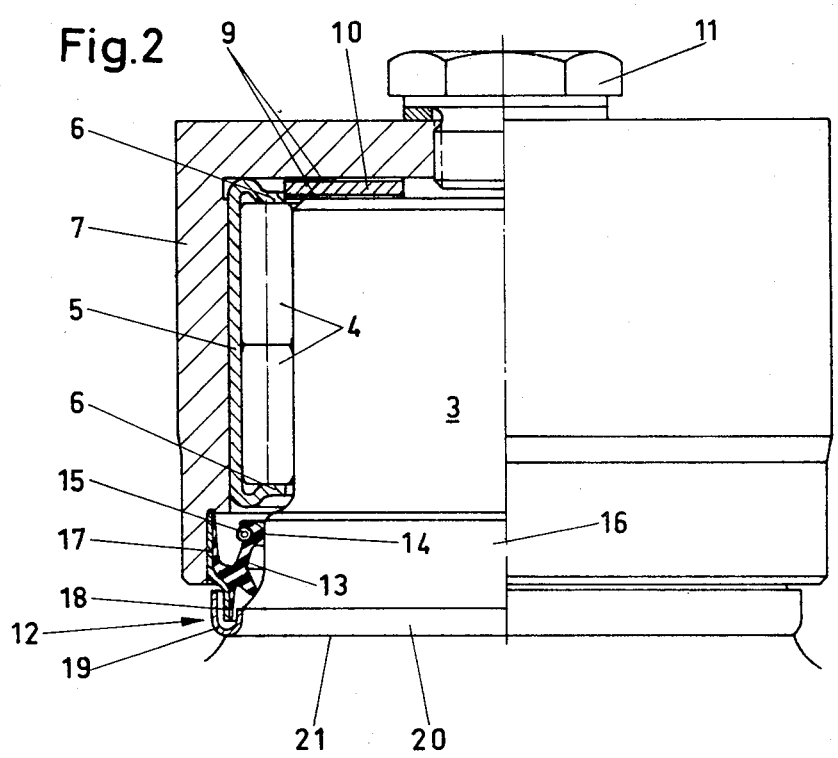

ROLLER BEARING, ESPECIALLY FOR THE BEARING OF THE STAR PIN OF A UNIVERSAL JOINT

The invention relates to roller bearing, especially for the bearing system of journal or star pins of universal joints wherein there is provided a pot-shaped solid bushing as an outer support.

In a heretofore known bearing of this general type the outer race of the roller bearing is provided directly at the inner periphery of the bushing. The bushing must therefore be subjected to a costly heat treatment (not German Petty Patent 1,939,397). Furthermore, butting faces for axially supporting the rollers are provided at the bushing and must have a fine surface finish.

It is an object of the invention to provide roller bearing, especially for the bearing of the star pin of an universal joint which has the same advantages as the roller bearing of the heretofore known type though produced at lower manufacturing cost.

It has been known heretofore to provide the outer race for the ring of rollers of a needle bearing at the inner wall of a cylindrical sheet metal sleeve which guides the ring of rollers axially on both sides thereof at flanged butting rims. The sleeve proper is supported in a solid bearing casing. These features have the sole purpose in the heretofore known needle bearings of producing a complete built-in unit which can be manufactured and shipped independently of bearing pins or sleeves.

Although the objective sought by this construction for the heretofore known needle bearing differs from the objective sought to be achieved by the invention of the instant application, use is made of the aforementioned solution for the objective with respect to needle bearing.

Consequently, there is provided in accordance with the invention, roller bearing for a bearing system of journal pins in universal joints having a pot-shaped solid bushing as an outer support for the rollers of the bearing, which comprises a sheet-metal sleeve press-fitted in the solid bushing, the sleeve forming at the inner surface thereof an outer race for the rollers, the sleeve having ends formed as guiding rims for the rollers.

With the combination of the solid pot-shaped bushing and the sheet-metal sleeve as carrier of the outer race for the rollers, the advantage is especially obtained that costly machining operations such as polishing or grinding the lateral butting surfaces for the bearing rollers and the insertion and hardening of the solid bushings are dispensed with. It is only necessary to harden the sheet-metal sleeve, a process which can be effected at substantially little cost when compared to the cost required for heat-treating the solid bushing.

In accordance with yet another feature of the invention the sheet-metal sleeve has a nitrided surface produced by subjecting the same to a nitriding bath, so that the sheet-metal sleeve has a slight depth of hardening zone. Thereby the material of the sleeve remains elastic in the core of the sleeve while the material at the surface has the hardness required for wear-resistant travel.

Furthermore, since the guiding rims for the rollers are inherently elastically resilient, they provide an adequate axial play for the rollers thereby further dispensing with the need for an additional spring member for axially biasing or bracing the rollers of the ring of rollers.

Other features which are considered as characteristic for the invention are set forth in the appended claims.

Although the invention is illustrated and described herein as embodied in roller bearing, especially for the bearing of the star pin of a universal joint, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a sectional view of part of the fork of a universal joint with a journal pin and a bearing therefor inserted in the opening of one of the legs of the fork; and FIG. 2 is an enlarged fragmentary view, partly in section, of FIG. 1 with the fork omitted, showing the bearing and seal for the pin.

Referring now to the drawing and first particularly to FIG. 1 thereof, there is shown therein a universal joint having two forks 1 mutually offset by 90°, only one of the forks 1 being shown in the figure. The forks 1 are connected in a conventional manner by a universal joint spider 2. In FIG. 1 only that end of the spider 2 which belongs to the opening of the upper leg of the fork 1, as viewed in FIG. 1, is shown. As is also the case for the other three non-illustrated ends of the spider 2, the illustrated end thereof is formed as a journal pin 3 received in the fork opening. The pin 3 forms the inner race for two fully rolling rings of rollers. i.e., a double-row radial roller bearing the outer race for the roller bearing 4 is formed by the inner peripheral surface of a drawn sheet-metal sleeve 5 formed with peripherally flanged ends 6 which retain the roller bearing 4 axially at both sides thereof. The sheet-metal sleeve 5 is, in turn, supported by the inner surface of a pot-shaped solid bushing 7 which is received in the opening of the fork 1 and is secured against falling out by a Seege or circlip lock ring 8.

The combination of the bushing 7 with the sheet-metal sleeve 5 forming the outer race for the roller bearing 4 has the advantage that the bushing 7 need not be heat-treated and that the otherwise necessary lateral engagement surfaces along which the rollers of the roller bearing 4 run need not be provided at the bushing 7 as was done conventionally heretofore. It is only necessary that the sheet-metal sleeve 5 be nitrided whereby very slight depths of hardness are attainable and at substantially lower cost than would be required for heat-treating the solid bushing 7. Furthermore, an auxiliary spring member for biasing the rollers in axial direction thereof is dispensed with because the peripherally flanged edges of the sheet-metal sleeve 5, due to the elasticity thereof, ensure the required axial play for the roller bearing 4.

An end engagement disc 10 formed with recesses 9 on both sides thereof is floatingly disposed between the base of the pot-shaped bushing 7 and the outer end of the pin 3. The end engagement disc 10 ensures a uniform supply of lubrication to the roller bearings which can be filled through a filling screw 11 in the base of the bushing 7. Moreover, the end engagement disc 10 assures an axial support of the pin 3 with very slight friction, since the recesses formed in the disc 10 serve as reservoirs for lubricant so that a lubricant film is always present between both end faces of the end engagement disc 10 and the respective adjacent surfaces of the bushing base and of the pin 3.

A seal generally identified by the reference numeral 12 is provided between the foot of the pin 3 and the inner end of the solid bushing 7. The seal 12 includes a radial shaft sealing ring 13 having a sealing lip 14 which is retained by a worm spring 15 in contact with a sealing surface 16 formed at the pin 3. The shaft sealing ring 13 is held at the outer periphery thereof by a sheet-metal casing 17 which is, in turn, fitted in a recess at the inner end of the bushing 7. The sheet-metal casing 17 has a free section 18 extending parallel to the axial direction of the pin 3, and away from the shaft seal 13 in direction toward the center of the universal joint spider 2. The section 18 is surrounding with sealing play by a sheet-metal part 19 having a substantially U-shaped cross section, the radially inner leg of the U being press-fitted on a ledge 20 in engagement with a shoulder 21 of the universal joint spider 2.

In this manner, a split seal 18, 19 is serially connected to the contact seal 13 and keeps dirt and dust away from the lip 14.

I claim:

1. In a bearing system for journal pins of universal joints, a cylindrical roller bearing comprising in combination a pot-shaped solid bushing of rigid construction, a sheet-metal sleeve press-fitted in said solid bushing, said sleeve forming an outer race of the roller bearing at the inner surface thereof, and a double row of end-to-end axially aligned cylindrical rollers received in said sleeve in rolling engagement with said outer race, said sleeve having ends formed as guiding rims for said rollers.

2. Roller bearing according to claim 1, wherein said sheet-metal sleeve has a nitrided surface with a slight depth of hardness zone.

* * * * *